J. BAZELL.
SHOCK NEUTRALIZER.
APPLICATION FILED JUNE 6, 1914. RENEWED JULY 14, 1916.
1,202,958.
Patented Oct. 31, 1916.
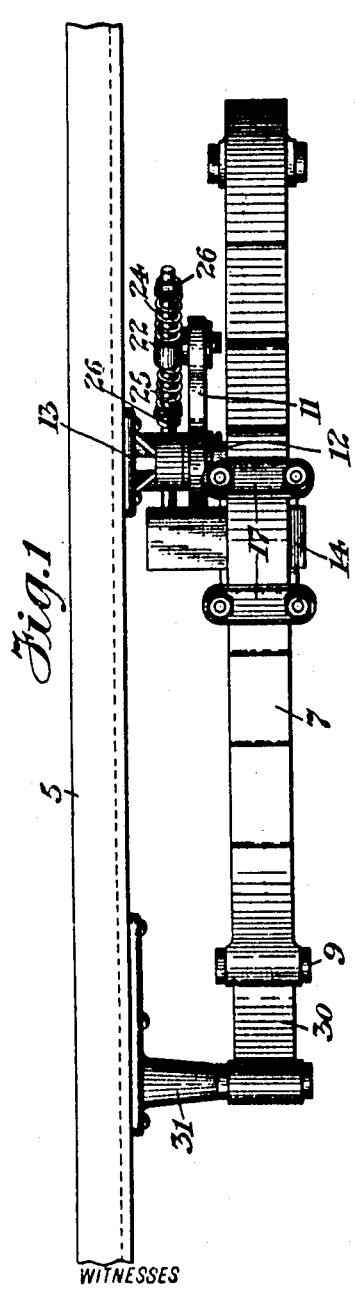
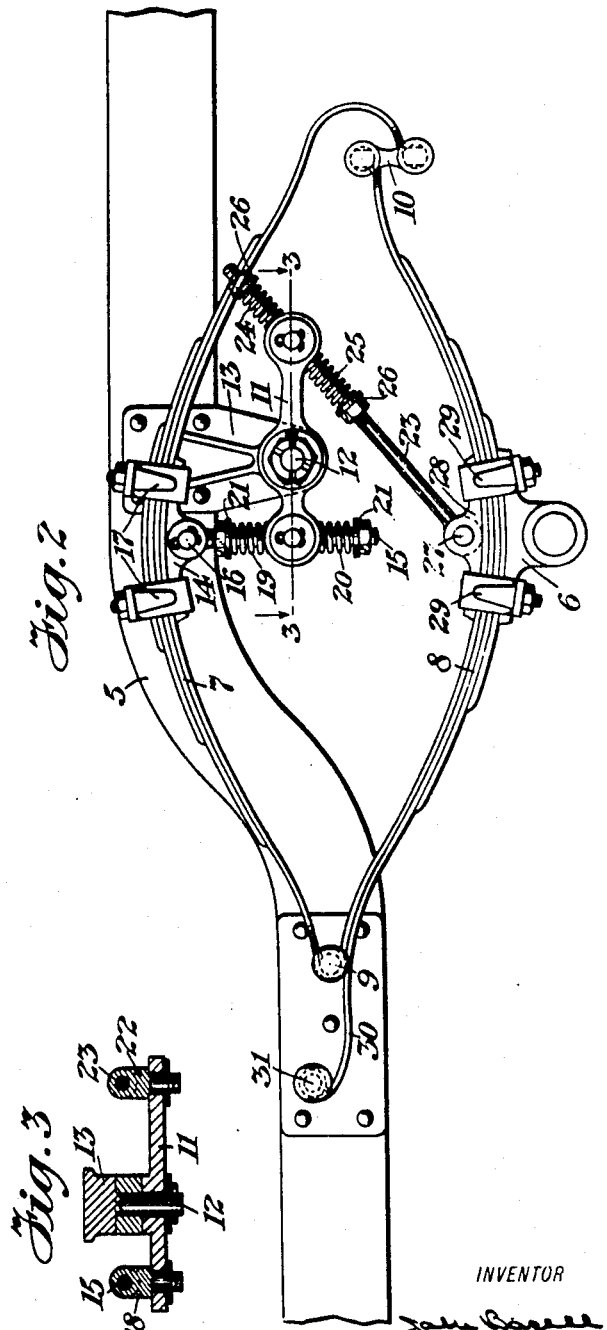
WITNESSES
INVENTOR
ATTORNEY

UNITED STATES PATENT OFFICE.

JAKE BAZELL, OF NEW YORK, N. Y.

SHOCK-NEUTRALIZER.

1,202,958.  Specification of Letters Patent.  Patented Oct. 31, 1916.

Application filed June 6, 1914, Serial No. 843,387. Renewed July 14, 1916. Serial No. 109,406.

*To all whom it may concern:*

Be it known that I, JAKE BAZELL, citizen of the United States, and resident of New York, in the county of Bronx and State of New York, have invented certain new and useful Improvements in Shock-Neutralizers, of which the following is a specification.

My invention relates to devices for neutralizing, and eliminating to as great an extent as possible, the effect upon the body of an automobile or similar vehicle of shocks transmitted from the wheel of the vehicle due to irregularities in the roadbed; and the objects of my invention are to provide a shock neutralizing device in which the shocks are not transmitted to the body of the vehicle, and one in which vertical movements of the wheel of the vehicle due to passing over a projection or falling into a depression in the roadbed are not accompanied by a concomitant vertical movement of the body of the vehicle, and to provide a device in which the range of vertical movement of the body of the vehicle permitted by the springs in the normal operation thereof and at times when excessive irregularities in the roadbed are not encountered, is reduced to a minimum.

With the above and other objects of invention in view, my invention consists in the improved shock neutralizing device illustrated in the accompanying drawing, described in the following specification, and claimed in the clauses of the concluding claim, and in such variations and modifications thereof as will be obvious to those skilled in the art to which my invention relates.

In the drawing accompanying and forming a part of this application and wherein the preferred embodiment of my invention is illustrated: Figure 1 is a view illustrating my improved shock neutralizing device in plan and showing the manner in which the same is connected with the frame of an automobile or similar vehicle; Fig. 2 is a view showing the shock neutralizing device and a portion of the frame in side elevation; and Fig. 3 is a view showing a section taken upon a horizontal plane indicated by the line 3—3, Fig. 2.

Referring to the drawing upon which the same reference numerals designate the same parts in the several views, the numeral 5 designates a portion of the frame of an automobile or similar vehicle and upon which the body is supported, and 6 designates a suitable bracket which is connected with the axle of the vehicle in any way and either directly or indirectly, and which bracket partakes of the vertical movements of the axle, as will be understood.

Supported from the bracket 6 is a double elliptic spring comprising two oppositely located spring members 7, 8, each of which members is commonly made up of a plurality of leaves as is usual in spring construction and the ends of which members are connected with one another in any way, as, for example, either directly as shown at 9 or through an intervening link 10.

The reference numeral 11 designates a rocking lever pivotally supported intermediate its ends upon a stud 12 which forms a fulcrum for the lever and which stud is located at the lower end of a bracket 13, which bracket in turn is connected with the frame 5: from which it will be seen that the frame and the body of the vehicle are supported from the lever 11 through the stud 12 and the bracket 13 which carries said stud, and that the spring members are not themselves directly connected with the frame; the connection between the frame and spring being effected through the bracket 13, lever 11 and the other elements of the shock neutralizing device hereinafter referred to.

The reference numeral 14 designates a bracket or stirrup carried by the upper spring member 7 and with which the upper end of a vertically extending rod 15 is pivotally connected as shown at 16, said stirrup being shown as held to the spring member by means of clips 17. This rod extends loosely through an opening provided in an abutment 18 carried by the left hand end of the lever 11, see Fig. 3; and the numerals 19, 20 designate two coil springs surrounding the said rod, the adjacent ends of said springs abutting against opposite sides of the said abutment and the remote ends thereof abutting against two stops 21 carried by the rod. The rod is preferably threaded and the stops formed by nuts in threaded engagement with the rod, and intervening washers as shown, so that by varying the position of the nuts upon the rod the degree of compression to which the springs 19, 20 are subjected may be varied, as will be understood.

The right hand end of the lever 11 carries an abutment 22 similar to the abutment 18 and having an opening through which the upper end of an inclined rod 23 extends, and in which it fits loosely; and 24, 25 designate two coil springs surrounding the said rod, and the adjacent ends of which abut against opposite sides of the abutment 22, while the remote ends of these springs abut against stops 26, similar to the stops 21 above referred to. The lower end of the rod 23 is pivotally connected to the lower spring, or to any other suitable part of the running gear. In the present instance, it is connected at 27 with a bracket or stirrup 28, which stirrup is held in a fixed position relative to the lower spring member 8 in any suitable way as by means of clips 29 which, in the embodiment of my invention illustrated, secure the bracket 6, spring member 8, and said stirrup together. The abutments 18 and 22 are provided with studs which extend through holes provided in the lever 11, as best shown in Fig. 3, whereby rocking connections are provided between the abutments and the lever, as will be understood.

The forward end of the spring members 7, 8 is preferably connected with the frame 5 through a suitable connection which acts as a radius bar or link, and, in the drawing, such a connection is shown as accomplished by providing the spring member 8 with a leaf having a forwardly extending portion 30 the free end of which is connected to a stud 31 carried by the frame member 5.

The rods 15 and 23, the coil springs 19, 20, 24 and 25, the rocking lever 11, and the stud 12 which, at the instant when a shock occurs, forms a fulcrum for said lever, constitute shock neutralizing or absorbing elements of my device; while these same elements form transmission mechanism through which the weight of the body is transmitted to the spring members 7, 8 in such a way as to greatly reduce the vertical movement of the body during the normal operation of the vehicle and when no shocks are encountered, at which times the abutment 22 forms the fulcrum of the lever.

When in use the coil springs 19, 20, 24 and 25 are placed under initial compression to such a degree that in the normal running of the vehicle and when the device is not operating to neutralize the effect of shocks none of them will be further compressed, at which time the weight of the body will be transmitted through the frame 5, bracket 13, lever 11 and rod 15 to the spring members 7, 8, the abutment 22 then acting in effect as the fulcrum of the lever and the coil springs 19, 20, 24 and 25 acting in effect as rigid members. Under such conditions and so long as no large obstructions or irregularities in the road are encountered the supporting spring members 7, 8, are the only springs in action, and these spring members support the body of the vehicle and act in the same way as though the shock absorbing springs above referred to were not present except that the vertical movements of the body will be reduced in magnitude because of the use of the swinging lever, the vertical movement of the bracket 13 being less than one-half the vertical movement of the rod 15 when the proportion of the parts is as shown in the drawing. If, however, a projection is encountered in the road the effect upon the elements herein described is to force the axle and the bracket 6 upward, which movement is transmitted through the rod 23, spring 25, lever 11, spring 20, and rod 15 to the upper spring member 7, which member is thus moved downward; the stud 12 tending to remain in whatever position it is in at the instant a shock is transmitted through the parts herein referred to because of the inertia of the frame with which the bracket 13 is connected and the body carried by the frame, while the spring member 7 is readily moved because of its small mass. This movement of the spring members 7 and 8 toward one another and the accompanying movement of the free ends of the lever 11 in opposite directions about the stud 12 as a fulcrum, will be accompanied by no or by a minimum vertical movement of the bracket 13 and the body of the vehicle because of the inertia of the body. On the other hand, if the wheel of the vehicle drops into a depression the bracket 6 moves downward, and motion is transmitted through the rod 23, spring 24, lever 11, spring 19, and rod 15 to the upper spring member 7, which member is thus moved upward; but this movement of the spring members 7 and 8 away from one another and the accompanying movement of the free ends of the lever 11 in opposite directions about the stud 12 as a fulcrum, will for the same reason be accompanied by no or but little vertical movement of the bracket 13 and the body.

The sudden and abnormal movement of the spring members 7 and 8 toward or away from one another, as projections or depressions are encountered in the road, may obviously occur at the instant when the spring member 7 is in the upper, the lower, or any intermediate position which it assumes during the slow vibratory movements of the vehicle body during normal operation and when shocks due to obstructions or depressions have not to be absorbed or neutralized. Such abnormal movement, however, will always act to move the free ends of the lever 11 in opposite directions about the stud 12 as a temporarily fixed fulcrum, irrespective of the vertical position occupied by the stud and bracket at the instant when the effect of a shock is to be neutralized, which movement, however, is in no case accompanied by a concomitant vertical movement of the bracket and body.

The above explanation does not take into account the resilience of the coil springs through which movement is imparted to the upper spring member 7 as the spring members move simultaneously toward or from one another. Of course a part of the shock transmitted from the bracket 6 will always be absorbed by those of the coil springs through which movement is or tends to be transmitted in the manner above explained, thus reducing the range of movement of the spring members toward or from one another; and, if the shocks are not excessive, they will be entirely absorbed by the coil springs, in which case no movement of the upper spring member occurs.

Having thus described and explained my invention, I claim and desire to secure by Letters Patent:

1. In a spring construction for vehicles, an elongated spring member; means for supporting the ends of said spring member from the running gear of the vehicle; a rocking lever; resilient means connecting one end of said lever with the intermediate portion of said spring member; means supporting the other end of said lever from the running gear of the vehicle; and a frame member supported from said lever.

2. In a spring construction for vehicles, an elongated spring member; means for supporting the ends of said spring member from the running gear of the vehicle; a rocking lever; means connecting one end of said lever with the intermediate portion of said spring member; resilient means supporting the other end of said lever from the running gear of the vehicle; and a frame member supported from said lever.

3. In a spring construction for vehicles, an elongated spring member; means for supporting the ends of said spring member from the running gear of the vehicle; a rocking lever; resilient means connecting one end of said lever with the intermediate portion of said spring member; resilient means supporting the other end of said lever from the running gear of the vehicle; and a frame member supported from said lever.

4. In a device of the class described, an elliptic spring comprising two oppositely disposed elongated spring members; a frame member; a rocking lever the central portion of which is fulcrumed upon said frame member; and resilient means connecting said spring members with said lever upon opposite sides of the fulcrum thereof.

5. In a device of the class described, an elliptic spring comprising two oppositely disposed elongated spring members; a rocking lever; resilient means connecting the ends of said lever with the central portions of said spring members; and means whereby a frame member may be supported from said lever.

6. In a device of the class described, an elliptic spring comprising two oppositely disposed elongated spring members; a rocking lever; resilient means connecting the ends of said lever with the central portions of said spring members; and a frame member to which said lever is pivotally connected intermediate its ends.

7. In a device of the class described, an elliptic spring comprising upper and lower elongated spring members connected with one another at their ends; a frame member; a rocking lever the central portion of which is pivotally connected with said frame member; resilient means connecting one end of said lever with the upper of said spring members; and resilient means connecting the other end of said lever with the lower spring member.

8. In a device of the class described, a frame; an elliptic spring comprising upper and lower elongated spring members and one of which members is provided with a forwardly extending portion the free end of which is connected with said frame; a rocking lever the central portion of which is pivotally connected with said frame; resilient means connecting one end of said lever with the central portion of the upper of said spring members; and resilient means connecting the other end of said lever with the lower spring member.

9. In a device of the class described, an elliptic spring comprising two oppositely disposed elongated spring members; a frame; a connecting member through which the forward end of said spring is connected with said frame; a rocking lever the central portion of which is pivotally connected with said frame; means connecting one end of said lever with the central portion of one of said spring members and which means includes two springs through either of which force may be transmitted from one of said parts to the other; and means connecting the other end of said lever with the central portion of the other of said spring members.

10. In a device of the class described, a frame; an elliptic spring comprising two oppositely disposed elongated spring members connected with one another at their ends and one of which members is provided with a forwardly extending portion the free end of which is connected with said frame; a rocking lever the central portion of which is pivotally connected with said frame; means connecting one end of said lever with the central portion of one of said spring members and which means includes two springs through either of which force may be transmitted from one of said parts to the other; and means connecting the other end of said lever with the central portion of the other of said spring members.

11. In a device of the class described, an elliptic spring comprising two oppositely disposed elongated spring members; a frame; a rocking lever the central portion of which is pivotally connected with said frame; means connecting one end of said lever with the central portion of one of said spring members and which means includes two springs either of which may be compressed as force is transmitted from one of said parts to the other; and means connecting the other end of said lever with the central portion of the other of said spring members.

12. In a device of the class described, an elliptic spring comprising two oppositely disposed elongated spring members connected with one another at their ends; a frame; a rocking lever the central portion of which is pivotally connected with said frame; two abutments carried by said lever and located one at each end thereof and each of which abutments is provided with an opening; two rods connected one at the central portion of each of said spring members, and which rods extend one through each of the openings aforesaid in said abutments and which rods are provided each with two stops; and two coil springs surrounding each of said rods, the adjacent ends of which springs abut against said abutments and the remote ends of which abut against said stops.

13. In a device of the class described, an elliptic spring comprising two oppositely disposed elongated spring members connected with one another at their ends; a frame; a rocking lever the central portion of which is pivotally connected with said frame; two abutments carried by said lever and located one at each end thereof and each of which abutments is provided with an opening; two stirrups located one at the central portions of each of said spring members; two rods connected one with each of said stirrups and which rods extend one through each of the openings aforesaid in said abutments and which rods are provided each with two stops; and two coil springs surrounding each of said rods, the adjacent ends of which springs abut against said abutments and the remote ends of which abut against said stops.

14. In a device of the class described, an elliptic spring comprising upper and lower elongated spring members connected with one another at their ends; a frame; a connecting member through which said spring is connected with said frame; a rocking lever the central portion of which is pivotally connected with said frame; means connecting one end of said lever with the central portion of the upper of said spring members and which means includes two springs through either of which force may be transmitted from one of said parts to the other; and means connecting the other end of said lever with the lower spring member.

15. In a device of the class described, an elliptic spring comprising upper and lower elongated spring members connected with one another at their ends; a frame; a rocking lever the central portion of which is pivotally connected with said frame; two abutments carried by said lever and located one at each end thereof and each of which abutments is provided with an opening; two rods connected one with the central portion of the upper of said spring members and the other with the lower spring member, and which rods extend one through each of the openings aforesaid in said abutments and are provided each with two stops; and two coil springs surrounding each of said rods, the adjacent ends of which springs abut against said abutments and the remote ends of which abut against said stops.

Signed at New York, in the county of the Bronx and State of New York, this 31st day of May, A. D. 1914.

JAKE BAZELL.

Witnesses:
  SYDNEY ABRAHAM SHUBIN,
  HYMAN B. GABLE.

Copies of this patent may be obtained for five cents each, by addressing the "Commissioner of Patents, Washington, D. C."